No. 791,465. PATENTED JUNE 6, 1905.
R. C. HENDERSON.
FERTILIZER DISTRIBUTER AND PLANTER.
APPLICATION FILED JUNE 20, 1904.

5 SHEETS—SHEET 1.

Fig. 1.

Witnesses

Inventor
R. C. Henderson
By R. W. & A. B. Lacey, Attorneys

No. 791,465. PATENTED JUNE 6, 1905.
R. C. HENDERSON.
FERTILIZER DISTRIBUTER AND PLANTER.
APPLICATION FILED JUNE 20, 1904.
5 SHEETS—SHEET 2.
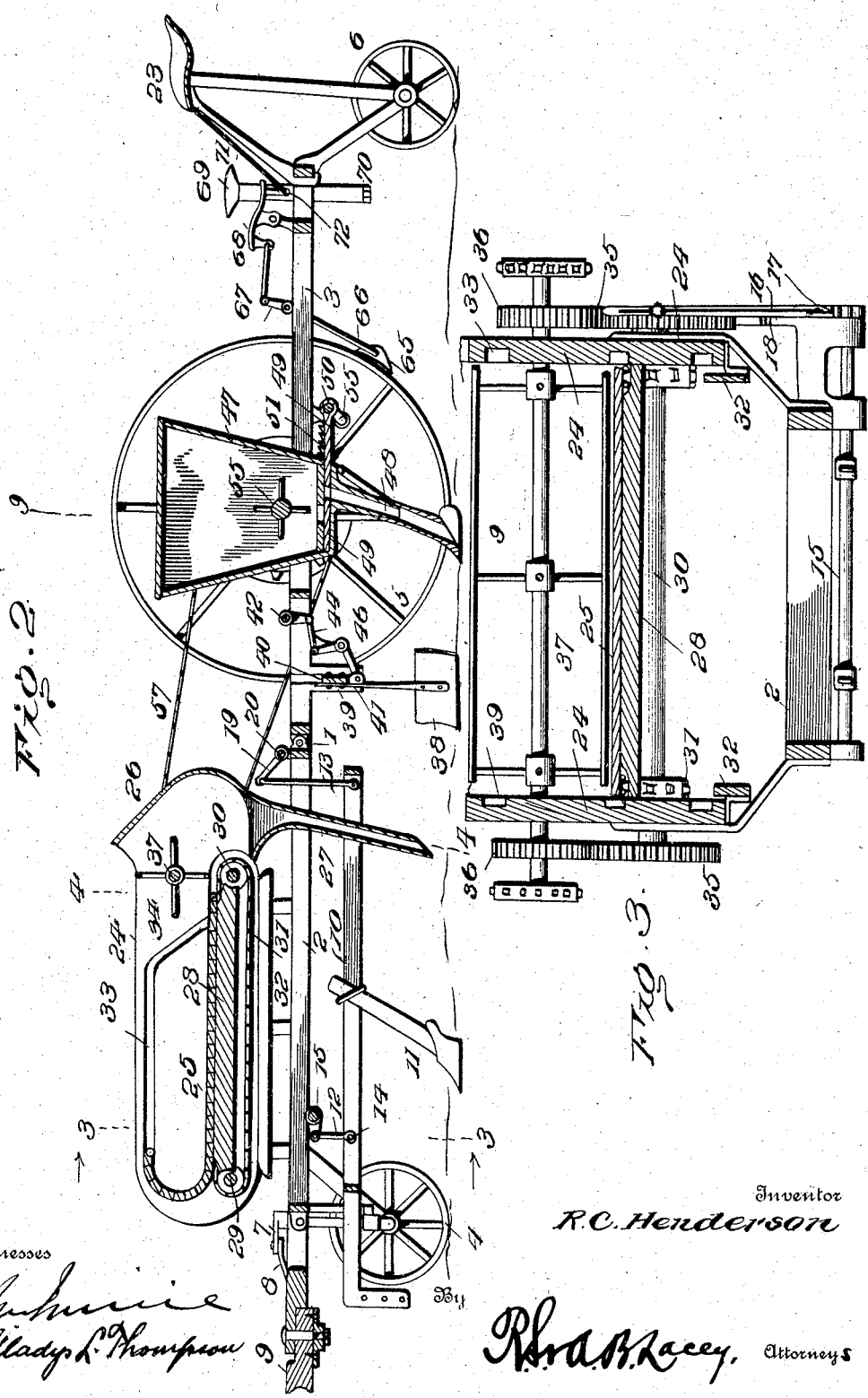
Witnesses
Gladys L. Thompson
Inventor
R. C. Henderson
By
R. & A. B. Lacey, Attorneys No. 791,465. PATENTED JUNE 6, 1905.
R. C. HENDERSON.
FERTILIZER DISTRIBUTER AND PLANTER.
APPLICATION FILED JUNE 20, 1904.
5 SHEETS—SHEET 3.
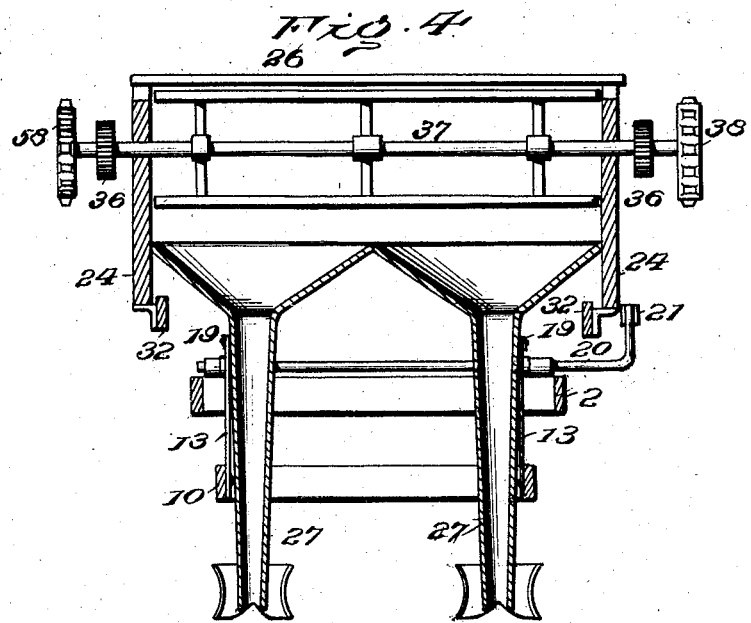
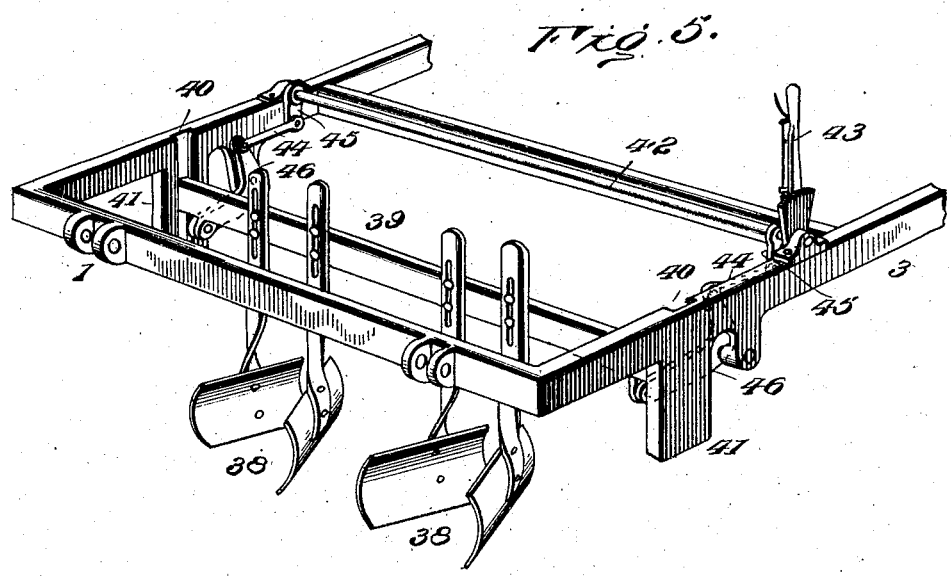
Inventor
R. C. Henderson
Witnesses
By
Attorneys No. 791,465. PATENTED JUNE 6, 1905.
R. C. HENDERSON.
FERTILIZER DISTRIBUTER AND PLANTER.
APPLICATION FILED JUNE 20, 1904.
5 SHEETS—SHEET 4.
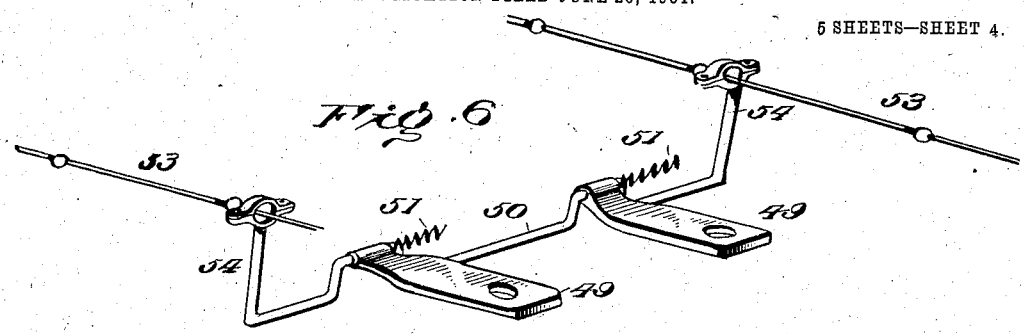
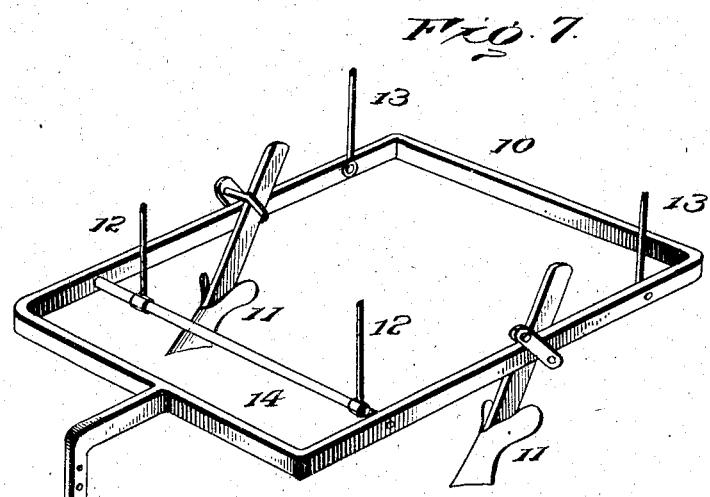
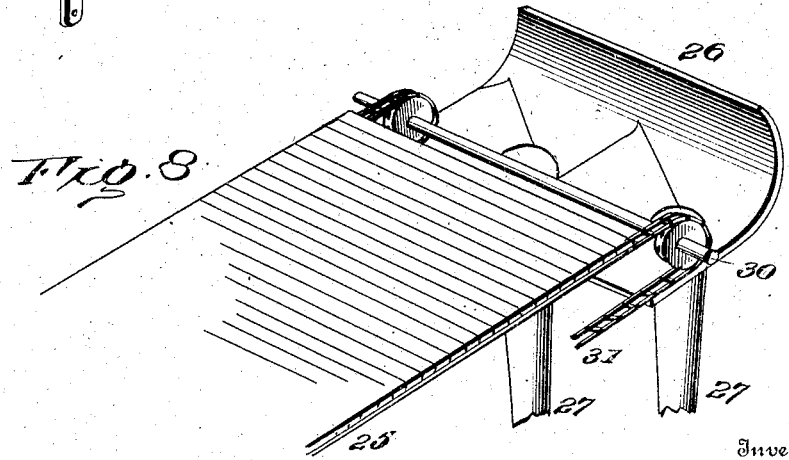
Inventor
R. C. Henderson
Witnesses
Gladys L. Thompson
By
R. H. A. P. Lacy, Attorneys No. 791,465. PATENTED JUNE 6, 1905.
R. C. HENDERSON.
FERTILIZER DISTRIBUTER AND PLANTER.
APPLICATION FILED JUNE 20, 1904.
5 SHEETS—SHEET 5.
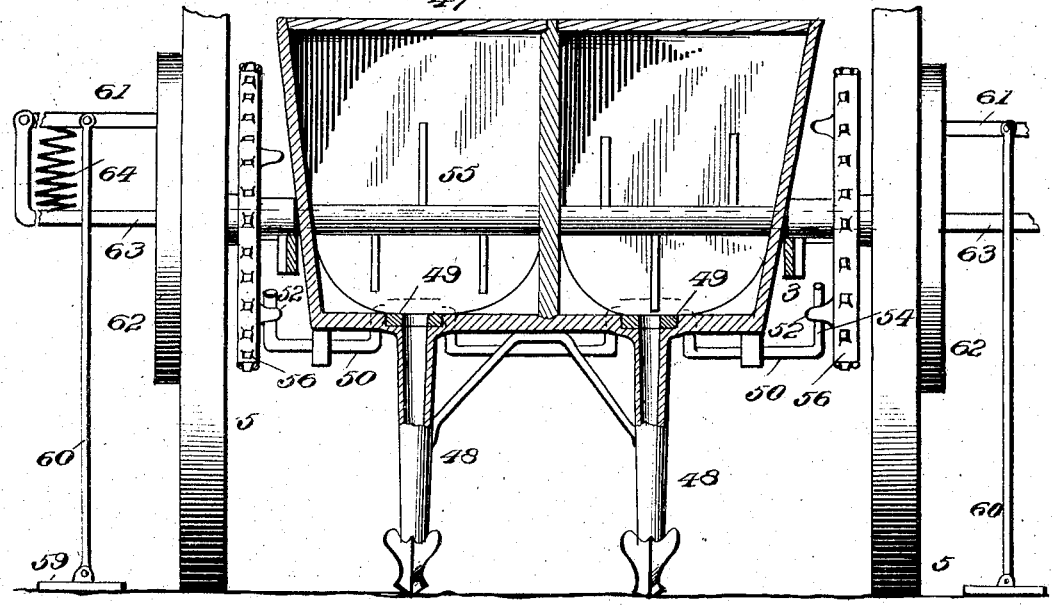
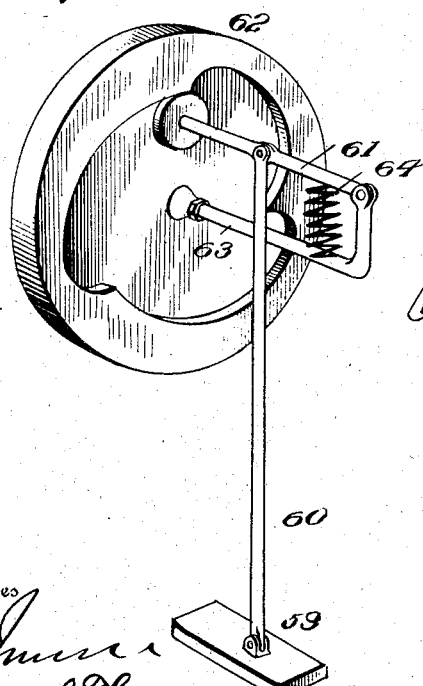
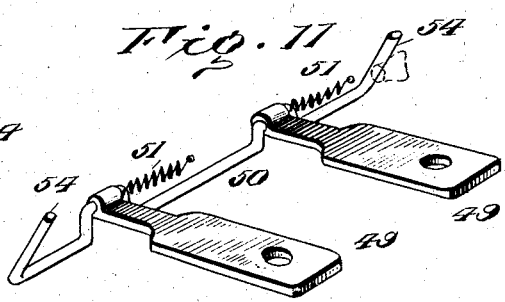
Inventor
R. C. Henderson
Witnesses
Gladys L. Thompson
By
R. W. A. P. Lacey, Attorneys No. 791,465.

Patented June 6, 1905.

UNITED STATES PATENT OFFICE.

RUFUS C. HENDERSON, OF KANKAKEE, ILLINOIS.

FERTILIZER-DISTRIBUTER AND PLANTER.

SPECIFICATION forming part of Letters Patent No. 791,465, dated June 6, 1905.

Application filed June 20, 1904. Serial No. 213,349.

*To all whom it may concern:*

Be it known that I, RUFUS C. HENDERSON, a citizen of the United States, residing at Kankakee, in the county of Kankakee and State of Illinois, have invented certain new and useful Improvements in Fertilizer-Distributers and Planters, of which the following is a specification.

This invention has for its object the provision of an implement for preparing the soil for reception of grain and sowing the latter at one operation, thereby materially reducing the expense and labor attendant upon planting and fertilizing.

The machine comprises in its organization means for distributing compost, manure, or other fertilizer, means for sowing the grain either in check-rows or drills, as may be required, and means for marking the land when the implement is used in the capacity of a check-row planter.

For a full description of the invention and the merits thereof and also to acquire a knowledge of the details of construction of the means for effecting the result reference is to be had to the following description and drawings hereto attached.

While the essential and characteristic features of the invention are susceptible of modification, still the preferred embodiment of the invention is illustrated in the accompanying drawings, in which—

Figure 1 is a perspective view of a machine embodying the invention. Fig. 2 is a central longitudinal section of the machine. Fig. 3 is a transverse section on the line 3 3 of Fig. 2 looking to the rear, as indicated by the arrows. Fig. 4 is a cross-section on the line 4 4 of Fig. 2. Fig. 5 is a detail perspective view of the adjustable frame carrying the coverers. Fig. 6 is a detail perspective view showing modified means for operating the planter mechanism. Fig. 7 is a detail perspective view of the adjustable frame carrying the openers. Fig. 8 is a detail perspective view of the rear portion of the fertilizer-distributer, showing the upper portion of the spouts and the rear part of the flexible support upon which the fertilizer is placed. Fig. 9 is a transverse section of the machine on the line 9 9 of Fig. 2 looking to the rear. Fig. 10 is a detail perspective view of a marker and its actuating mechanism. Fig. 11 is a detail perspective view of the means for operating the seed-dropping mechanism.

Corresponding and like parts are referred to in the following description and indicated in all the views of the drawings by the same reference characters.

The frames for supporting the fertilizer-distributing mechanism and the planter appliances are pivotally connected at 1, as shown most clearly in Fig. 2, to admit of their ready conformation to the condition of the surface over which the machine may be drawn. The frame for supporting the fertilizer mechanism is indicated at 2, and the frame for receiving the planter devices is represented at 3. Caster-wheels 4 support the front portion of the frame 2, and ground-wheels 5 are arranged about medially of the frame 3. Trailer-wheels 6 support the rear portion of the frame 3 and cover the grain. Because of the unusual length of the combined machine the caster-wheels 4 are provided to enable the same being turned in a comparatively small space when it is required to recross the field. The standards supporting the caster-wheels 4 are provided at their upper ends with arms 7, which are connected by links 8 with the rear portion of the pole or tongue 9, whereby lateral movement of said pole or tongue in either direction will cause the caster-wheels to correspondingly turn and enable the machine to be reversed in about its length.

A frame 10 is suspended below the frame 2 and is provided with opening plows or shovels 11 for forming the trenches or furrows into which the fertilizer is dropped. Chains, cables, or analogous flexible connections 12 and 13 support the frame 10. The chains 12 are attached at their lower ends to a rod or bar 14 of the frame 10 and are connected at their upper ends to a shaft 15, journaled in bearings applied to the frame 2 and adapted to be rotated, so as to lengthen or shorten the connections 12 according to the relative elevation of the frame 10. Suitable means are provided for coöperation with the shaft 15 to admit of rotating the same and holding it in an adjusted position. As shown, a lever 16, a ratchet and pawl 17, and a segment 18, coöperating with the usual hand-latch applied to the lever 16, are provided as instrumentalities for effecting the result aforesaid.

The chains or connections 13 are fastened at their lower ends to the frame 10 and are attached at their upper ends to arms 19, projected from rock-shaft 20, and which is connected, by means of a rod 21, to an operating-lever 22, arranged at the rear end of the frame 3 and within convenient reach of the driver's seat 23 to admit of lifting the frame 10 to throw the openers 11 out of the ground when it is required to turn the machine at the end of a row or for any other purpose. The operating-lever 22 is provided with the usual hand-latch and toothed segment for holding it in an adjusted position.

The fertilizer-distributer comprises a box formed of side pieces 24, a flexible bottom 25, and a curved end piece 26, forming a guard and from which spouts 27 project, so as to convey the fertilizer into the furrow or trench and prevent scattering thereof by the wind. A horizontal support 28 is arranged near the lower edge of the side pieces 24 and reinforces the flexible bottom or support 25. Shafts 29 and 30 are arranged at opposite ends of the support 28 and are provided with pulleys or rollers, around which pass endless chains 31. These chains are connected in any manner to the front portion of the flexible bottom 25, so as to compel a movement thereof with the chains to insure positive feed of the fertilizer into the distributing-spouts 27. Tracks 32 are arranged below the lower run of the endless chains 31 to support the bottom 25 as it moves forward after passing around the pulleys or rollers applied to the rear shaft 30. A guide-groove 33 is provided in the inner face of each side piece 24 and gives proper direction to the flexible bottom 25. The rear end portion of each guide-groove 33 is rearwardly and downwardly inclined, as shown at 34, thereby admitting of the part 25 being moved so as to form with the guard 26 a hopper into which fertilizer—such as guano, lime, or the like—may be placed. When the part 25 is arranged so as to form a hopper with the guard 26, it is disconnected from the operating-chains 31. A gear-wheel 35 is secured to a projecting end of the shaft 30 and meshes with a pinion 36, secured to a projecting end of the shaft of the reel 37. The reel 37 is located at the rear end of the box containing the fertilizer and acts as a beater or agitator to insure positive delivery of the fertilizer.

The coverers 38 are in line with the respective openers 11 and distributing-spouts 27 and consist of pairs of blades having a forward diverged arrangement, so as to move the earth inward to partially fill the trench or furrow into which the fertilizer has been dropped. The coverers have adjustable connection with a transverse bar 39, and the latter is vertically adjustable at its ends in guides 40, formed in the inner sides of the hangers 41, pendent from the side bars of the frame 3. A rock-shaft 42 is mounted in bearings of the frame 3 and is oscillated by means of an operating-lever 43, secured thereto and provided with the usual hand-latch and notched segment for holding it in an adjusted position. Links 44 connect arms 45 of the rock-shaft 42 with an arm of bell-cranks 46, pivoted to pendent portions of the frame 3. The other arm or member of the bell-cranks 46 is connected to the bar 39.

By reason of the construction and arrangement of the parts just described a movement of the operating-lever 43 causes the rock-shaft 42 to turn and the bell-cranks 46 to oscillate, with the result that the bar 39 and openers 38 receive a corresponding vertical movement.

The hopper for containing the seed or grain is designated at 47 and may be subdivided, as indicated in Fig. 9. Grain-spouts 48 extend from discharge-openings in the bottom of the hopper and terminate in points for opening the soil for reception of the grain. Seed-slides 49 are mounted to reciprocate at a point between the bottom of the hopper and the receiving end of the grain-spouts in order to deliver the grain to the spouts in measured quantity. The seed-slides 49 are connected to crank portions of a crank-shaft 50, as shown most clearly in Figs. 6 and 11, and which crank-shaft is mounted so as to have an oscillatory movement imparted thereto. Coil-springs 51 coöperate with the crank-shaft 50 to hold the same and the seed-slides in normal position. The crank-shaft 50 may be operated either by means of tappets 52, as shown most clearly in Fig. 9, or by means of a check-line 53, as illustrated in Fig. 6. In either case the crank-shaft is provided with offstanding arms 54, to be engaged by the operating means. A stirrer or agitator 55 is arranged within the hopper 47 to prevent arching or banking of the grain therein. Sprocket-wheels 56 are connected to the ground-wheels 5 for rotation therewith and are provided with the tappets 52, and power is taken therefrom for operating the fertilizer-distributing mechanism by means of drive-chains 57, which pass around sprocket-pulleys 58, applied to the shaft of the reel 37.

The marker for indicating the hills, thereby making it possible to plant the seed in parallel transverse rows, comprises the indenting-piece 59, rod 60, lever 61, and cam-wheel 62, the latter forming a part of or being connected to the ground-wheel 5. The lever 61 is fulcrumed between its ends to a bracket 63, and a spring 64 coöperates with the lever 61 to move it in opposition to the cam portions of the cam-wheel 62. A marker is provided for each side of the machine. As the ground-wheels rotate the cam-wheels 62 are correspondingly operated and produce an oscillatory movement of the lever 61 and a reciprocating movement of the markers, whereby the ground is indented. The several mechanisms are so timed that at each dropping of the seed the markers are operated and impress the soil, whereby the adjustment of the planting mechanism is rendered possible, so as to insure transverse alinement of the hills. A brake-shoe 65 is applied to each ground-wheel 5 and is attached to an arm 66 of a rock-shaft 67. A foot-lever 68 is connected to an arm of the rock-shaft 67 to admit of application of the brakes when required.

For properly spacing the machine on the return trip in either direction markers 69 are employed and are pivotally connected to pendent portions 70. A cord or rope 71 connects the marker on one side of the machine with the marker on the opposite side and passes over the pulleys 72 intermediate of its ends. When one marker is trailing upon the ground, the opposite marker is elevated, as illustrated most clearly in Fig. 1. When the machine is turned preliminary to recrossing the field, the marker 69, previously arranged to trail upon the ground, is elevated and the other marker is lowered into position and the machine adjusted so that the last-mentioned marker will trail in the line made by the previous marker, thereby insuring proper spacing of the longitudinal rows.

Having thus described the invention, what is claimed as new is—

1. In an agricultural implement of the character described, the combination of a fertilizer-distributer and a planter having their frames pivotally connected, an opener, means for delivering fertilizer in the rear of the opener, a coverer for moving the earth over the fertilizer and arranged in advance of the planter mechanism, and independent means for vertically adjusting the opener and coverer, substantially as set forth.

2. In combination, a frame, fertilizer-distributing means supported by means of said frame, a second frame provided with an opener, means for supporting the second frame in an adjusted position, and other means under control of the driver for moving said second frame to throw the opener out of action, substantially as described.

3. In combination, a frame, fertilizer-distributing means supported by means of said frame, a second frame suspended below the first-mentioned frame and provided with an opener, flexible connections for supporting said second frame, means for lengthening and shortening one of the flexible connections to effect vertical adjustment of the frame and opener, a rock-shaft having offstanding arms to which the other flexible connections are attached, and an operating-lever under control of the driver for turning said rock-shaft to throw the opener out of action when required, substantially as specified.

4. In combination, vertical guides, a transverse bar having its end portions mounted in said guides, shovel-blades connected to said bar, bell-cranks having one member connected to the bar, a rock-shaft, arms projected from said rock-shaft and connected to the other member of the bell-cranks, and means for operating the rock-shaft for holding it in an adjusted position, substantially as set forth.

In testimony whereof I affix my signature in presence of witnesses.

RUFUS C. HENDERSON. [L. S.]

Witnesses:
J. H. MERRILL,
J. M. HENDERSON,
P. C. HART.